Figure 1:
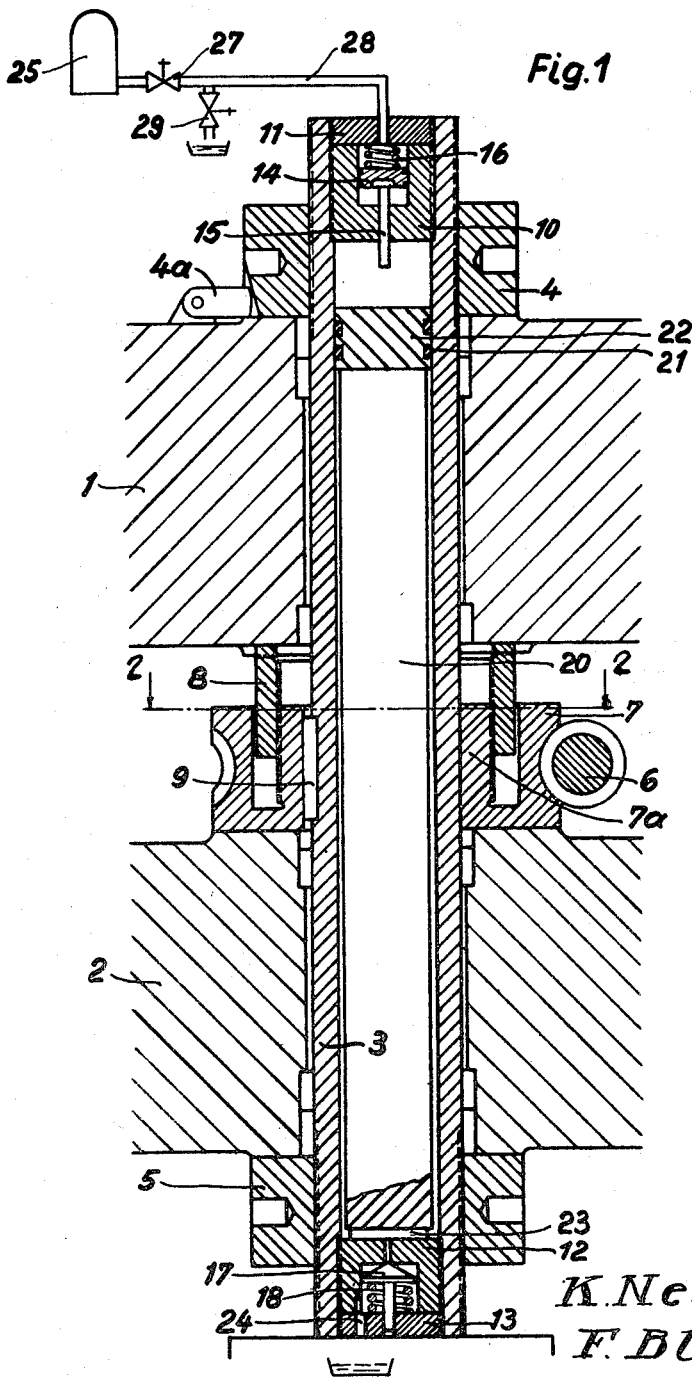

May 3, 1960   K. NEUMANN ET AL   2,934,968
HYDRAULIC BOLT STRESSING SYSTEM
Filed Sept. 11, 1958   2 Sheets-Sheet 2

INVENTORS
K. Neumann
F. Blinn
ATTYS.

2,934,968
Patented May 3, 1960

2,934,968

HYDRAULIC BOLT STRESSING SYSTEM

Karl Neumann and Franz Blinn, St. Ingbert, Saar, Germany, assignors to Moeller & Neumann G.m.b.H., St. Ingbert, Saar, Germany Application September 11, 1958, Serial No. 760,421

Claims priority, application Germany December 23, 1957

9 Claims. (Cl. 74—424.8)

The present invention relates broadly to the art of adjusting mechanisms.

More particularly, the invention relates to adjusting mechanisms of the nut and spindle types, such as are incorporated in a frameless rolling mill for adjustably supporting the housings or chucks that accommodate the necks of the rolls.

Thus, this invention relates to mechanism for lengthening a staying means incorporated between the housings or elements to be adjusted, so cooperatively related with the staying means that the lengthening or elongation thereof is effective independently of tightening nut means that are incorporated on the staying means. Specifically, this invention relates to the lengthening of the staying means or pre-tensioning or prestressing the connection between the roll chucks or housings by applying hydraulic pressure on the ends of the staying means.

An arrangement for lengthening staying screws is known which utilizes a hydraulic spreading device so as to obtain easier tightening or loosening of heavily loaded nuts, and which device includes one part that in effect by-passes the tightening nuts and acts on the end of the staying screw and another part which presses against one of the bodies or elements to be adjusted, after which actuation of these parts the unstressed nut can be readily tightened or loosened. When the nut is tightened and the hydraulic pressure in the working chamber of the spreading device is reduced or released, the staying screw contracts or shortens so as to place itself under tension.

However, since in this known arrangement the hydraulic pressure applied during the lengthening of the staying screw must be directed against one of the bodies or elements to be adjusted, and since it has to exert a pulling force on one end of the staying screw, it is not possible to make adjustments of two parts to be adjusted relative to each other, since they remain under tension even while the staying screw is being lengthened or elongated. If the aforementioned known hydraulically actuated spreading device be utilized in connection with a pre-tensioned rolling mill mounting for the chucks or roll mounts, which obviously must have to be adjustable relative to each other, it would be necessary in order to actuate the adjusting mechanism, to loosen the tightening nuts in the staying screws and thereupon, by reducing the hydraulic pressure in the spreading device eliminate or at least reduce the tension to a point such that the driving of the adjusting device consisting, for example, of the nut and spindle, is effective to make an adjustment of the roll chucks under the amount of tension still remaining.

It is also known to develop a shrinking tension in the columns of presses, more particularly in connection with the struts or girders supported by the columns by introducing into the hollow end portions of the columns a heating mechanism or an electric heating rod in order to utilize heat to elongate the ends of the columns prior to tightening of nuts on the columns. This heating relationship can be utilized only if sufficient time is available to heat the ends of the columns to be tensioned. In addition, it is difficult to adjust accurately to a desired tension, a factor which is very important in view of modern calculating methods to determine the variable loading of expansion screws.

Therefore, the present invention has for an object to provide, in an adjusting mechanism of the nut and spindle type that is operable to vary the spacing between at least two opposed elements and which incorporates elongated staying means having tightening nut means bearing against one or more of the elements to be adjusted, an arrangement for elongating the staying means independently of the tightening nut means operable to rapidly adjust the desired elongation and thus the tension or prestressing in the staying means which applies a variable hydraulic pressure upon the ends of the staying means and which pressure during the process of elongating of the staying means does not act on the parts or elements to be adjusted. Consistent with this object, the present invention provides a hollow staying means and means for applying hydraulic pressure upon the opposite ends of the staying means.

Accordingly, the present invention has for an object to provide for a simplified arrangement for obtaining hydraulic elongation of the staying means which eliminate any particular or special structural elements that would be operative to exert a pulling effect upon one end of the staying means. In addition, by constructing the staying means in the form of a pipe, an arrangement is provided which conforms to the theory of an expansion screw, as well as being effective to produce elongation of the staying means without unduly high hydraulic pressure, so as to avoid sealing difficulties.

The adjusting mechanism including the hydraulically actuated staying screw elongating arrangement is particularly effective for application to a pretensioned mounting for rolling mill rolls, with the advantage that during the elongation of the staying means, the roll mounts or chucks journalling the rolls, become tension-free because of the increase in interior pressure, so that these mounts can be adjusted easily and rapidly with respect to one another, such adjustment being required in adjusting the rolls of sheet mills from pass to pass.

In order to obtain an easy adjustment and to eliminate hydraulic pressure in the hollow staying means, the invention provides a pressure translator at one end of the staying means, including a displacement plunger extending into the fluid-filled pressure chamber of the staying means, a pressure reacting piston of larger diameter than and associated with the plunger, and a tension spring acting on this piston for placing the pressure translator under moderate tension during the operation of the mill, so that the fluid in the chamber of the staying means will completely fill the interior hollow cross section thereof, so as to produce, without loss of time, the desired high pressure within the staying means when an additional force is applied upon the surface of the piston, whereby the heating of the staying means and of the fluid therein and the variable expansion coefficients of staying means or pipe and fluid balances the unequal expansion of pipe and fluid and further prevents the possibility of the fluid boiling in case of the very high heating.

It is additionally proposed according to the invention, to provide a check valve means at one end of the staying means, so that any faulty operation in the process of producing tension in the staying means cannot result in exceeding the desired tension.

It is a further object of the invention to provide in an adjusting mechanism operable to vary the spacing between at least two opposed elements and which includes staying means passing through the elements, tightening nut means associated therewith, adjusting means for effecting relative displacement of the elements, a chamber within the staying means to accommodate fluid, hydraulic means for applying pressure on the fluid in the chamber to elongate the staying means during prestressing thereof, including a structural arrangement operative to prevent the occurrence of tangential stress in the wall of the chamber.

In accordance with the foregoing object, the invention provides a core element within the chamber extending over a substantial portion within the length thereof, acted upon at one end by hydraulic pressure and having its other end firmly connected with the staying means.

The invention is not limited to adjusting mechanisms, but can be used for any connection assembly which is provided with a so-called expansion screw of a certain pretension as a spindle for the connection of at least two elements. By the arrangement according to the invention, it is avoided that the pretension is caused merely by tightening the nut of such a connection assembly by means of a torque wrench, whereby the correct adjustment of the pretension is made difficult. A uniform pretension of all connection screws e.g. is very important for the connection of the cylinder cover with the cylinder head or the cylinder housing of a combustion engine.

Figure 2:
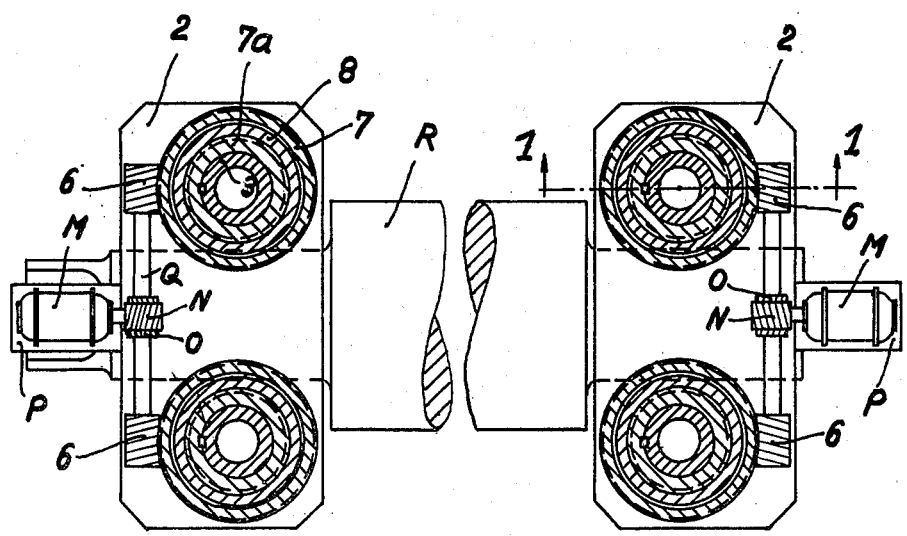

Further and more specific objects will be apparent from the following description taken in connection with the accompanying drawing in which:

Figure 1 is a fragmentary vertical section view through a frameless, pre-tensioned two-high rolling mill mount, including roll housings, staying means and tightening nuts associated therewith, adjusting mechanism for varying the relative position of the housings and an embodiment of an arrangement for elongating the staying means as a section following line 1—1 in Figure 2, and Figure 2 is a horizontal section following line 2—2 in Figure 1, illustrating the disposition of the lower roll of a 2-high rolling mill in the mounts or chucks and the disposition of four adjusting mechanisms.

In the drawings the respective roll housings are designated by 1 and 2, it being obvious that there are a plurality of staying means supporting the housings so that the rolls R, carried thereby are arranged in operative relation one above the other. The staying means include a hollow spindle or pipe 3 extending through the roll housings, the latter having aligned bores to accommodate the same. Tightening nuts 4 and 5 are in threaded engagement with the opposite threaded ends of the spindle or pipe 3. An adjusting mechanism for varying the spacing between the housings 1 and 2 for adjusting the rolls R includes a worm shaft 6 and threaded engagement with a worm wheel 7, rotatably supported on the upper surface of the lower housing or element 2 and splined as at 9 to the spindle or pipe 3, which is rotatably mounted within the bores in the housings. The worm wheel is provided with an annular groove having external threads on the inner wall thereof for cooperation with internal threads and an annular nut element 8. The portion 7a of the worm wheel therefor constitutes a drivable adjusting element. The nut 8 is fixed relative to the housing or element 1 by means, such as teeth on the upper end of the edge of nut 8 and on the lower surface of the housing 1. In addition, the groove on the interior of the worm wheel element 7 accommodates the key 9 and extends completely longitudinally the worm wheel so that relative longitudinal movement between the spindle or pipe 3 and worm wheel can be accommodated.

If the aforementioned components are assembled together and the nuts 4 and 5 are screwed on the spindle 3 to the point that no play exists between the mutually adjacent surfaces of the nuts and mounts or housings, and there is no prestressing in the pipe or spindle 3, the total vertical height of the adjusting components 6, 7 and 8 determine the distance between the two housings or roll mounts and thus the position of the rolls R.

If the interior threads of the nut 8 have the same pitch as the threads of nut 4, and if nut 4 is prevented from turning by lock 4a being swung into engagement with the groove in the periphery of the nut and if nut 5 can turn with the spindle or pipe 3, then the turning of worm 6 will result in raising or lowering of roll housing or mount 1 relative to roll mount 2, depending on the direction of rotation. The adjusting force at worm 6 corresponds with the weight to be lifted and with the friction torque occurring. In order to effect pretensioning or prestressing of pipe or spindle 3 in a simple and easy manner, and so as to be capable of removing this pre-tension before actuation of the adjusting mechanism, the spindle 3 is, as stated, hollow and is closed at its upper end by closure plug 10 having external threads in engagement with interior threads at the upper end of the spindle 3. Closure plug 10 is covered by apertured cover piece 11 also threaded with the spindle 3. The lower end of the spindle 3 is closed by similarly shaped closure plug and cover components 12 and 13. The closure plug 10 has an interior chamber therein, containing a multiplier device including a piston 14 and a plunger 15 extending therefrom and passing through a bore in the bottom of the closure plug so as to be disposed within the interior of spindle 3. A tension spring 16 is mounted between the cover 11 and plunger 14. In this form of the invention the chamber within the other closure plug 12 contains a check valve 17 cooperating with the bore through the base of closure plug 12 and a very strong spring 18 biased between the check valve and the cover 13 holds valve 17 closed. Cover 13 further has a drain opening 24 therethrough communicating with the chamber in the interior of the closure plug 12.

If, the interior of spindle 3 being filled with liquid, a pressure is applied to plunger 14 by introducing fluid under pressure through the bore in cover 1, this pressure is multiplied in a ratio of the diameter of piston 14 to the diameter of the small plunger 15 and acts upon the fluid in the pipe. A high tension is generated in the pipe or spindle 3 and the same elongates under the effect of this tension. As a result, play occurs between the upper surface of roll housing or element 1 and the lower surface of nut 4 or between the lower surface of housing 2 and the upper surface of nut 5, or between both housings and surfaces and nuts. One of the nuts can then be tightened again to eliminate play. If then the pressure is removed from the multiplier device, spindle 3 will contract and the component parts 1 to 5 and 7 and 8 are placed under a strong pre-tension or squeezing. With this pre-tensioning or prestressing worm 6 cannot be turned because the force required to do so is too great for any practical purposes.

Rolling is then carried out with the roll mounts under this pre-tension. If, for any reason, the gap between the rolls is to be changed, either because of wear or for other corrective or adjusting purposes, pressure is again applied on the piston 14, pipe 3 elongated and all of the component parts that had been inter-relatedly pre-tensioned become stress-free. With the relieving of the pre-tension stress, it is then easy to turn worm 6 and actuate the adjusting component so as to vary the gap between the rolls. After the desired adjustment has been made, the pressure acting on piston 14 is removed, the pipe contracts and all parts are again strongly pre-tensioned. The internal hydraulic pressure in the spindle or pipe also develops a tangential tensile stress which tends to cause a cross contraction, that is, a shortening of the spindle. However, the elongation of the spindle by means of the axial force acting against the upper and lower closure plugs is greater than the amount of contraction initiated by tensile stress acting tangentially on the wall of the spindle. The difference between these two factors, namely, elongation and contraction, constitutes the effective elongation of the spindle. On the other hand, the amount of elongation determines the desired pre-tension which is to be given to the roll chucks or mounts. Thus, after pre-tensioning has been effected, the spindle means are fixed by tightening nut provided at one end and then with the removal of the internal hydraulic pressure, tangential stress in the spindle wall will also disappear and a slight elongation of the spindle will occur which has a tendency to reduce the amount of pre-tension.

Therefore, in order to prevent the occurrence of tangential stress in the spindle or pipe, an embodiment of the invention contemplates the provision within the interior of the spindle or pipe of a core or pin 20 having a piston head 22 on its upper end carrying sealing or packing means 21 in sealing relation against the interior of the pipe or spindle. This core or pin extends over a substantial portion of the length of the spindle. The upper face of the piston 22 is acted upon by hydraulic pressure in the chamber between the piston head 22 and closure plug 10 and the bottom or base of the pin or core is firmly associated with the opposite end of the spindle or pipe.

The pressure fluid acts on the piston so that force is transmited through the core or pin 20 to the bottom closure plug 12. In this manner an elongation of the spindle or pipe 3 is effected without the occurrence of undesired tangential stresses in the wall of the spindle.

In order to carry off any fluid which might possibly leak past the seal or packing 21, the lower end of the pin or core is provided with a transverse groove 23 in communication with the central bore in the closure plug 12 and thus this fluid can escape through drain 24 in cover 13.

The invention contemplates constructing the core and piston as either integral elements or as separate parts.

With the form of invention just described the check valve 17 and spring 18 can be eliminated.

The working pressure for the spreading of a hollow spindle 3 is taken from a fluid accumulator 25 which is connected to the pressure chamber of piston 14 through pipe line 28. A valve 27 is provided for opening and closing pipe line 28. Valve 29 is provided for the relief of the pressure acting on piston 14, when valve 27 is closed, whereby the hollow spindle which has previously been elongated contracts again. The working pressure in the accumulator 25 is so high that, when considering the transmission ratio in the multiplier device, a pressure of about 600 to 800 atm. is obtained in the liquid of the hollow spindle 3, if plunger 15 dips into the liquid filling. The possible dipping depth of plunger 15 as shown in the drawings is sufficient for producing this pressure, which causes the desired elongation of the hollow spindle. In many cases an elongation in an amount less than 1 mm. is sufficient to eliminate the stresses from the system.

The spring 18 of the check valve 17 has to be so strong that by the high internal pressure in the hollow spindle no liquid is dropping out. Valve 17 is—among others— a precaution device in case the accumulator 25 is overloaded and hollow spindle 3 might receive a permanent deformation. If liquid has dropped out through drain 24, the filling of the hollow spindle has to be replenished by screwing cover 11 and removing the multiplier components 14, 15, and 16.

The driving device for four adjusting mechanisms of a 2-high rolling mill is shown in Figure 2. Two worm wheels 7 of an adjusting mechanism described above are each driven by a drive including electric motor M turning worm N which is in mesh with a worm wheel O, on shaft P to turn worm 6. Only the lower roll R, mounted in two roll housings 2, is shown in Figure 2. The motors M which can be synchronized to each other, are mounted on supports P which are fixed to the roll housings 2.

What is claimed is:

1. In an adjusting mechanism of the nut and spindle type operable to vary the spacing between at least two opposed elements and which mechanism includes elongated staying means and tightening nut means cooperable therewith and applying a tightening force against at least one of the elements to be adjusted, an arrangement for elongating the staying means independently of the tightening nut means, including a fluid containing chamber within the staying means, said chamber having opposite ends, a core means within the chamber extending over a substantial portion of the length thereof, said core means engaging at one end with one end of the chamber, a piston head at the other end of said core means, and means for applying variable hydraulic pressure on the fluid between said piston head and the other end of the chamber so that the pressure acts internally against opposite ends of the chamber.

2. In an adjusting mechanism of the nut and spindle type operable to vary the spacing between at least two opposed elements and which mechanism includes elongated staying means and tightening nut means cooperable therewith and applying a tightening force against at least one of the elements to be adjusted, an arrangement for elongating the staying means independently of the tightening nut means, including a fluid containing chamber within the staying means, said chamber having opposite ends, means for applying variable hydraulic pressure on the fluid so that the pressure acts internally against opposite ends of the chamber, said staying means comprising hollow spindle means, a closure plug means at the opposite ends of said spindle means delimiting said fluid containing chamber, fluid filling said chamber, a displaceable plunger operably associated with one of said closure plug means and extending into said chamber, a pressure reacting piston of larger diameter than said plunger and operably associated therewith, tension spring means acting on said piston to normally urge the same in the direction toward said chamber and the means for applying variable hydraulic pressure on the fluid including conduit means for leading fluid into contact with said piston for applying hydraulic pressure thereto.

3. In an adjusting mechanism as claimed in claim 2 and check valve means operably associated with the opposite end of said chamber.

4. In a connection assembly of the nut and spindle type which includes at least two elements to be connected, elongated staying means and tightening nut means cooperable therewith and applying a tightening force against at least one of said elements, an arrangement for elongating the staying means independently of the tightening nut means, said arrangement including a chamber within the staying means, said chamber having opposite ends, a core means within the chamber extending over a substantial portion of the length thereof, said core means engaging at one end with one end of the chamber, and having a piston head at its other end, and means for applying variable hydraulic pressure on the fluid in the chamber that is between said piston head and the other end of the chamber so that the pressure acts internally against opposite ends of the chamber.

5. A connection assembly as claimed in claim 4 and a bore through one end of said chamber, said piston having seal means bearing against the interior of the chamber, and said one end of the core having a passage therein in communication with said bore, whereby any fluid that leaks past the sealing means can escape through said bore.

6. In an adjusting mechanism as claimed in claim 5 and said piston and core being separate elements.

7. In an adjusting mechanism of the nut and spindle type operable to vary the spacing between at least two opposed elements and which mechanism includes elongated staying means and tightening nut means cooperable therewith and applying a tightening force against at least one of the elements to be adjusted, an arrangement for elongating the staying means independently of the tightening nut means, including a fluid containing chamber within the staying means, said chamber having opposite ends, means for applying variable hydraulic pressure on the fluid so that the pressure acts internally against opposite ends of the chamber, said staying means comprising hollow spindle means, a closure plug means at the opposite ends of said spindle means delimiting said fluid containing chamber, fluid filling said chamber, a displaceable plunger operably associated with one of said closure plug means and extending into said chamber, a pressure reacting piston of larger diameter than said plunger and operably associated therewith, tension spring means acting on said piston to normally urge the same in the direction toward said chamber and conduit means communicating with said piston for applying hydraulic pressure thereto, and a core means within the chamber extending over a substantial portion of the length thereof, said core means engaging at one end with one end of the chamber, and having a piston head at its other end.

8. In an adjusting mechanism as claimed in claim 7 and a bore through one end of said chamber, said piston having seal means bearing against the interior of the chamber, and said one end of the core having a passage therein in communication with said bore, whereby any fluid that leaks past the seal means can escape through said bore.

9. In a connection assembly of the nut and spindle type which includes at least two elements to be connected, elongated staying means and tightening nut means cooperable therewith and applying a tightening force against at least one of said elements, an arrangement for elongating the staying means independently of the tightening nut means, including a fluid containing chamber within the staying means, said chamber having opposite ends, means for applying variable hydraulic pressure on the fluid so that the pressure acts internally against opposite ends of the chamber, said staying means comprising hollow spindle means, a closure plug means at the opposite ends of said spindle means delimiting said fluid containing chamber, fluid filling said chamber, a displaceable plunger operably associated with one of said closure plug means and extending into said chamber, a pressure reacting piston of larger diameter than said plunger and operably associated therewith, tension spring means acting on said piston to normally urge the same in the direction toward said chamber and the means for applying variable hydraulic pressure on the fluid including conduit means for leading fluid into contact with said piston for applying hydraulic pressure thereto.

References Cited in the file of this patent
UNITED STATES PATENTS

| | | |
|---|---|---|
| 1,606,906 | Smith | Nov. 16, 1926 |
| 1,730,642 | Budd et al. | Oct. 8, 1929 |
| 2,571,265 | Leufven | Oct. 16, 1951 |
| 2,726,219 | Ray | Feb. 28, 1956 |
| 2,797,602 | Atherholt et al. | July 2, 1957 |
| 2,861,332 | Hayden | Nov. 25, 1958 |